(12) United States Patent
Velusamy et al.

(10) Patent No.: US 11,689,763 B2
(45) Date of Patent: Jun. 27, 2023

(54) CROSS-PARTY DIAGNOSTICS

(71) Applicant: T-Mobile USA, Inc., Bellevue, WA (US)

(72) Inventors: Senthil Kumar Mulluppadi Velusamy, Redmond, WA (US); Tyler Axdorff, Seattle, WA (US); Jonathan Soini, Seattle, WA (US); Parag Garg, Woodinville, WA (US); Spencer Schutz, Arvada, CO (US)

(73) Assignee: T-Mobile USA, Inc., Bellevue, WA (US)

( * ) Notice: Subject to any disclaimer, the term of this patent is extended or adjusted under 35 U.S.C. 154(b) by 444 days.

(21) Appl. No.: 17/035,572

(22) Filed: Sep. 28, 2020

(65) Prior Publication Data
US 2022/0103897 A1   Mar. 31, 2022

(51) Int. Cl.
*H04N 21/442* (2011.01)
*H04N 21/61* (2011.01)
*H04N 21/438* (2011.01)
*H04Q 9/00* (2006.01)
*H04L 1/00* (2006.01)
*H04L 67/61* (2022.01)
*H04L 43/55* (2022.01)
*H04L 47/2491* (2022.01)
*H04H 60/32* (2008.01)
*H04L 5/00* (2006.01)
(Continued)

(52) U.S. Cl.
CPC ...... *H04N 21/44209* (2013.01); *H04H 20/12* (2013.01); *H04H 60/32* (2013.01); *H04L 1/0026* (2013.01); *H04L 5/006* (2013.01); *H04L 43/55* (2022.05); *H04L 47/2491* (2013.01); *H04L 49/205* (2013.01); *H04L 67/61* (2022.05); *H04N 17/04* (2013.01); *H04N 21/26216* (2013.01); *H04N 21/438* (2013.01); *H04N 21/6131* (2013.01); *H04Q 9/00* (2013.01); *H04Q 2209/40* (2013.01)

(58) Field of Classification Search
None
See application file for complete search history.

(56) References Cited

U.S. PATENT DOCUMENTS 9,008,583 B2 *  4/2015  Shi .................... H04L 5/001
                                                455/67.11
9,596,517 B2 *  3/2017  Boatright ........... H04N 21/478
(Continued)

*Primary Examiner* — Ricky Chin
(74) *Attorney, Agent, or Firm* — Han Santos, PLLC

(57) ABSTRACT

Techniques described herein improve viewer experience by leveraging the ability of a viewer's device to access an over-the-top (OTT) content via the device's multi-channel connections to an OTT content server. In an example embodiment, the device receives the OTT content via a first channel and performs cross-party diagnostic testing through a second channel. In this embodiment, a diagnostic app in the device compares measured signals in the first channel with a first set of threshold values and further compares acquired telemetry data in the second channel with a second set of threshold values. Based on the comparison results, the device determines the possible root cause of the interruption. Further, the device performs an in-depth diagnostic testing on a determined possible root cause (e.g., OTT content server) and sends an in-depth diagnostic report to a viewer.

20 Claims, 6 Drawing Sheets

(51) Int. Cl.
*H04N 21/262* (2011.01)
*H04N 17/04* (2006.01)
*H04H 20/12* (2008.01)
*H04L 49/20* (2022.01)

(56) References Cited

U.S. PATENT DOCUMENTS

| | | | | |
|---|---|---|---|---|
| 10,419,796 | B2* | 9/2019 | Ross | H04N 21/6143 |
| 11,140,457 | B1* | 10/2021 | Jordan | H04N 21/64707 |
| 2006/0239271 | A1* | 10/2006 | Khasnabish | H04L 45/22 |
| | | | | 370/395.21 |
| 2010/0166051 | A1 | 7/2010 | Chung et al. | |
| 2011/0088072 | A1 | 4/2011 | Mehta | |
| 2013/0265446 | A1* | 10/2013 | Nicas | H04N 21/64738 |
| | | | | 725/62 |
| 2014/0153390 | A1* | 6/2014 | Ishii | H04W 28/0815 |
| | | | | 370/230 |
| 2014/0295825 | A1* | 10/2014 | Chuang | H04L 1/02 |
| | | | | 455/425 |
| 2014/0362768 | A1* | 12/2014 | Wood | H04W 52/0258 |
| | | | | 370/328 |
| 2015/0098446 | A1* | 4/2015 | Ye | H04W 36/0066 |
| | | | | 370/331 |
| 2015/0341945 | A1* | 11/2015 | Panchai | H04L 5/003 |
| | | | | 370/329 |
| 2015/0373574 | A1* | 12/2015 | Gordon | H04W 36/30 |
| | | | | 370/252 |
| 2016/0006837 | A1* | 1/2016 | Reynolds | H04L 41/0816 |
| | | | | 709/203 |
| 2016/0157209 | A1* | 6/2016 | Baldwin | H04L 65/611 |
| | | | | 370/216 |
| 2016/0255513 | A1* | 9/2016 | Lihosit | H04W 24/06 |
| | | | | 455/419 |
| 2016/0302125 | A1* | 10/2016 | Tejedor | H04W 52/244 |
| 2017/0006088 | A1* | 1/2017 | Tsunoda | H04L 12/44 |
| 2017/0257183 | A1* | 9/2017 | Vikberg | H04W 28/0231 |
| 2017/0374575 | A1* | 12/2017 | Kahtava | H04W 40/22 |
| 2019/0082338 | A1* | 3/2019 | Dion | H04N 21/47202 |
| 2019/0098067 | A1* | 3/2019 | Sandoval | H02J 13/00024 |
| 2019/0199772 | A1* | 6/2019 | Pennarun | H04L 65/80 |
| 2020/0008248 | A1* | 1/2020 | Beck | H04W 76/15 |
| 2020/0162951 | A1* | 5/2020 | Ketonen | H04L 41/5009 |
| 2020/0169457 | A1* | 5/2020 | Xiao | H04L 41/5067 |
| 2020/0178198 | A1* | 6/2020 | Ding | H04W 60/04 |
| 2020/0221186 | A1* | 7/2020 | Shambro, Jr | H04N 21/64707 |
| 2020/0230499 | A1* | 7/2020 | Buser | A63F 13/352 |
| 2020/0322827 | A1* | 10/2020 | Yao | H04L 5/003 |
| 2021/0026341 | A1* | 1/2021 | Iizuka | G06F 18/21375 |
| 2021/0064458 | A1* | 3/2021 | Rathinasabapathy | |
| | | | | G06F 11/0781 |
| 2021/0127345 | A1* | 4/2021 | Shi | H04W 74/0808 |
| 2021/0184943 | A1* | 6/2021 | Jia | H04W 28/0226 |
| 2021/0368244 | A1* | 11/2021 | Guajardo | H04N 21/6131 |
| 2022/0103897 | A1* | 3/2022 | Velusamy | H04N 21/44209 |
| 2022/0210031 | A1* | 6/2022 | Hu | H04W 24/02 |
| 2022/0338236 | A1* | 10/2022 | Cirik | H04L 5/0057 |

\* cited by examiner

CROSS-PARTY DIAGNOSTICS

BACKGROUND

Over-the-top (OTT) content providers have been providing OTT contents such as audio, video, and other media content to viewers via the Internet. OTT is a term for the delivery of the media content via an Internet connection rather than through a traditional cable or broadcast provider. In this case, the viewer may consume media content without subscribing to the traditional cable or satellite pay-TV service. The media content may include different television programs and/or movies that are available for the viewers to watch on-demand or in real-time. To ensure reliable delivery of the media content to the viewers, different protocols, improvements in hardware and/or software, and the like, have been implemented to improve the viewer's experience.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
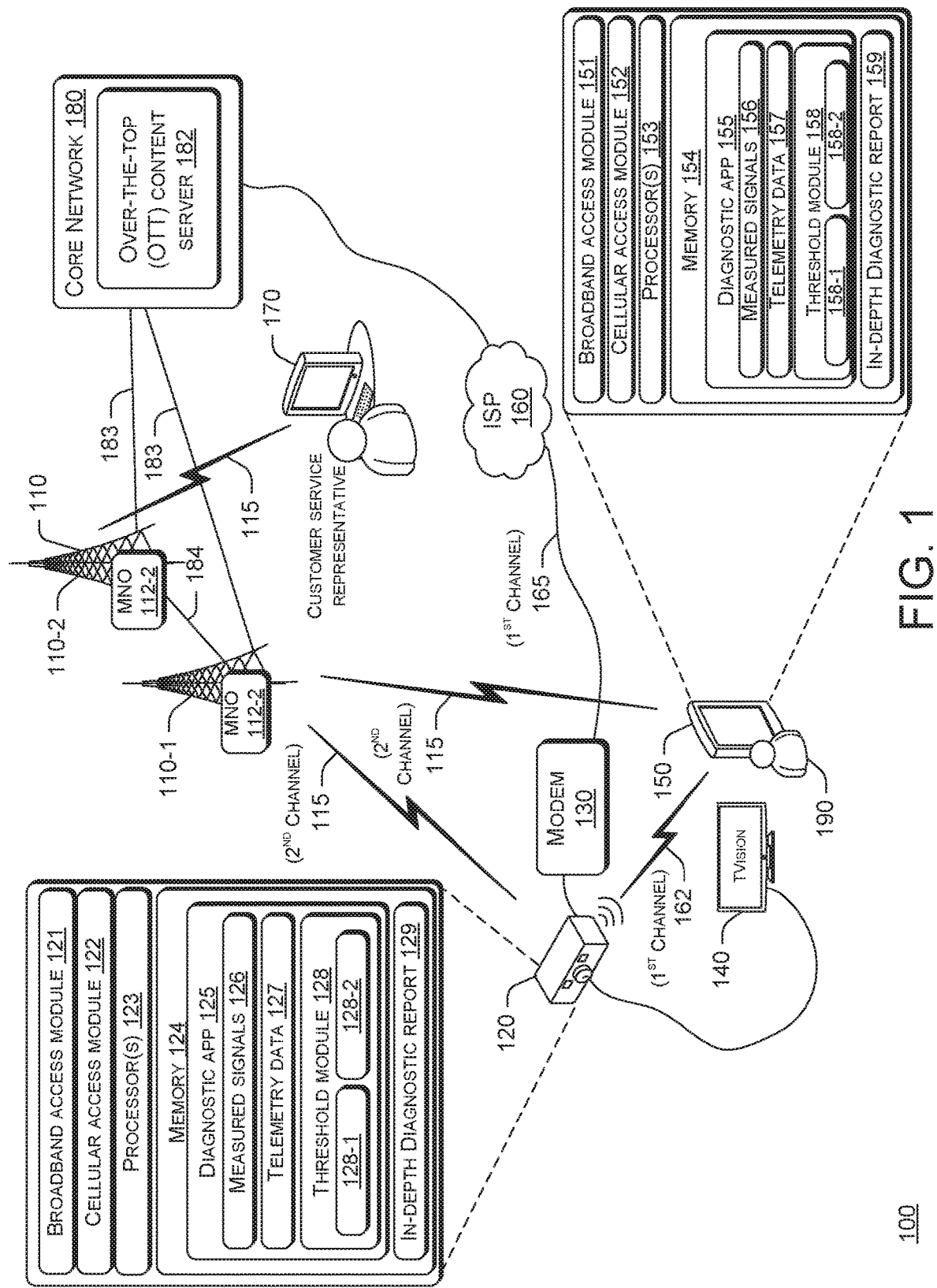
FIG. 1 illustrates an example of a network architecture for implementing cross-party diagnostic testing.

This disclosure is directed to techniques for improving a viewer's experience in receiving over-the-top (OTT) content through a device. The device can be, for example, a set-top-box (STB), user equipment (UE), such as a cell phone or other electronic device with a display and connectivity with a wireless telecommunications network, a smart TV, a tablet, a laptop computer, or other similar devices that can receive the OTT content. The viewer can be an owner of the device, a person who has a service contract with a wireless telecommunication services company (e.g., a mobile subscriber), a person who is an OTT content subscriber, and so forth. OTT content may include audio, video, or other media content that the device can access from an OTT content server via the Internet, through a telecommunication service provider network, and/or other alternate channels that connect the device to the OTT content server.

In example embodiments, the device improves the viewer's experience by leveraging its ability to connect with the OTT content server via different channels or interfaces. The ability to utilize alternate channels for diagnostic testing, viewer interaction, and/or back-up channel for the delivery of the OTT content may provide the viewer with extra resources to improve quality of service. For example, the device may utilize a first channel/interface for receiving of the OTT content and can use a second channel/interface for cross-party or multi-party diagnostic testing, which includes testing for interruptions in the delivery of the OTT content to a viewer. Since multiple different entities can be involved in the delivery of the OTT content to the viewer, the cross-party diagnostic testing may include looking at contributions of each involved entity and interactions between the entities and/or their contributions. In this manner, the cross-party diagnostic testing may first determine a possible root cause of an interruption in delivery of OTT content from the perspective of different parties to the subscription, and then perform additional diagnostic testing (in-depth diagnostic testing) on a server, component, interface, etc. that is determined to be the possible root cause of the interruption. Thereafter, the device sends a diagnostic test report to the viewer. With this information (diagnostic testing report), the viewer may avoid unnecessary trial and error troubleshooting of the interruption by contacting the different parties, which is costly and inefficient. As described herein, the interruption may include signal deviations or variations in the delivery of the OTT content to the viewer. For example, the interruption includes video and audio signal losses.

In example embodiments, the device may use a diagnostic application (app) to implement the cross-party diagnostic testing as described herein. The diagnostic app may include hardware, software, or a combination thereof, that compares signal measurements in a first channel and acquired telemetry data in a second channel with a first set of threshold values and a second set of threshold values, respectively. A channel may include a broadband channel such as an Internet Service Provider (ISP) channel, a cellular network channel such as Long Term Evolution (LTE) band channel, a Narrow Band-Internet of Things (NB-IoT) channel, a virtual private network (VPN), a Cat-M (LTE Cat-M1), or a dedicated licensed cellular network channel that connects the device to the OTT content server. The first set of threshold values (hereinafter referred to as "first threshold" for brevity) may include minimum values of the signal measurements in the channel (e.g., first channel) that are necessary or desirable for effective delivery of the OTT content in the same channel. The second set of threshold values (hereinafter referred to as "second threshold" for brevity) may include minimum values of acquired data metrics in the channel (e.g., second channel) based upon the minimum values of the signal measurements that are necessary or desirable for the effective delivery of the OTT content to the device in the same channel (i.e., second channel) or a separate channel (e.g., first channel). The signal measurements in the first channel (e.g., ISP channel) and the data metrics in the second channel (e.g., cellular network) may include parameters such as data throughput (uplink/downlink data rates), traffic pattern, latency, error rates, jitter, received signal strength indicator (RSSI) level, and the like. In this embodiment, the cross-party diagnostic testing utilizes comparison results between the signal measurements in the first channel and the first threshold, between the acquired data metrics in the second channel and the second threshold, and/or a combination thereof, to determine the root cause of the interruption. The correlation of the signal measurements in the first channel and the acquired telemetry data in the second channel may be based upon the assumption that the receiving of the OTT content from the same source (OTT content server), but via different channels/interfaces, may include related values. For example, a high definition media content utilizes a minimum of 10 MHz data throughput (i.e., first threshold) for the effective delivery of the OTT content through the first channel (e.g., ISP channel). In this example, the second threshold for the telemetry data in the second channel (e.g., cellular network) may also use the 10 MHz data throughput as the threshold value. In this case, the first threshold and the second threshold may use an equal set of threshold values (i.e., 10 MHz data throughput) for the cross-party diagnostic testing as described herein.

The device may use the first threshold as a reference for triggering the diagnostic app to perform the cross-party diagnostic testing. For example, the device uses the first channel (e.g., ISP channel or interface) to receive the OTT content and utilizes the second channel (e.g., cellular network channel or interface) to acquire the telemetry data. In this example, the device performs signal measurements in the ISP interface and compares the measured signals with the first threshold. If the measured signals are less than the first threshold, then a signal deviation (interruption) is detected, which can trigger the diagnostic app in the device. With the triggered diagnostic app, the device acquires the telemetry data in the second channel (e.g., cellular network interface) and compares the acquired telemetry data with the second threshold. Based on comparison results between the acquired telemetry data and the second threshold, the triggered diagnostic app may determine the possible root cause of the signal deviation and perform additional diagnostic testing (in-depth diagnostic testing) on the determined possible root cause of the signal deviation. For example, and when the measured signals and the acquired telemetry data are below the first threshold and the second threshold, respectively, then the diagnostic app may indicate the OTT content server as the possible root cause of the deviation. In another example, and when the measured signals in the ISP interface are below the first threshold, and the acquired telemetry data in the cellular network interface is above the second threshold, then the diagnostic app may indicate the ISP interface as the possible root cause of the deviation. In these examples, the diagnostic app may perform the in-depth diagnostic testing in the indicated possible root cause of the deviation and sends the in-depth diagnostic testing report to the viewer and/or other entities to the subscription.

The diagnostic app may also be triggered by a scheduled diagnostic testing or upon receiving a viewer's request. In this case, the diagnostic app performs the cross-party diagnostic testing regardless of whether a signal deviation is detected in the channel that is used for receiving of the OTT content. For example, the diagnostic app is triggered by the viewer's request. In this example, the diagnostic app performs signal measurements in the first channel (e.g., ISP interface) and compares the measured signals with the first threshold. Further, the diagnostic app acquires the data metrics in the second channel (e.g., cellular network) and compares the acquired data metrics with the second threshold. In this example, the diagnostic app may use the comparison results for determining the possible root cause of the problem in the subscription. For example, and in a case where the measured signals are above the first threshold, and the acquired data metrics are below the second threshold, then the diagnostic app may indicate the device itself or a device-connected television as the possible root cause of the interruption. In this case, the diagnostic app may also recommend further testing of the second channel (e.g., cellular network) based on the acquired data metrics that are below the second threshold. In another example, and in a case where the measured signals and acquired data metrics are above the first threshold and the second threshold, respectively, then the diagnostic app may indicate the device to be operating normally and the device-connected television may include the possible root cause of the interruption. In these examples, the diagnostic app may similarly perform the in-depth diagnostic testing in the indicated possible root cause of the interruption and sends the in-depth diagnostic testing report to the viewer and/or other entities to the subscription.

In various embodiments, the detection of the deviation is performed by a first device such as the STB while the acquiring and the comparing of the telemetry data with the second threshold is performed by a second device such as the viewer's mobile device. For example, the STB detects the signal deviation in the first channel that is used to receive the OTT content. Based on the detected signal deviation, the STB sends a signal to trigger the diagnostic app in the viewer's mobile device. The viewer's mobile device may then request for the signal measurement data from the STB and then perform a comparison between the requested signal measurements and the first threshold. The viewer's mobile device may further perform comparisons between the telemetry data that it acquires and the second threshold. Based on these comparisons, the viewer's mobile device may determine the possible root cause of the deviation in the STB. The viewer's mobile device may further perform in-depth diagnostic testing on the determined possible root cause of the deviation. The viewer's mobile device may then send the in-depth diagnostic testing report to the viewer and/or other entities to the subscription.

In example embodiments, the in-depth diagnostic testing includes further testing of hardware and/or software of the suspected possible root cause of the deviation. The in-depth diagnostic testing or diagnostic testing may include, but is not limited to, determining software error in the OTT content server (e.g., subscription provider), checking broken links in the ISP interface and/or cellular network interface, verifying ISP connection status, determining STB-connected device error (i.e., device-connected television), STB software report, television(s) connections status, I/O ports status of the STB, a check home phoneline networking alliance (HPNA) networking status between the STB and other house devices that are connected to the same modem, STB system ICs status, and the like.

The techniques described herein may be implemented in a number of ways. Example implementations are provided below with reference to the following figures.

Example Network Architecture

FIG. 1 illustrates an example network architecture 100 for delivering over-the-top (OTT) content from an OTT content server to a viewer's device. The device, for example, may receive the OTT content via one of its multi-channel connections to the OTT content server. The device may then utilize another channel connection to directly communicate with the OTT content server, to perform cross-party diagnostic testing, and/or to communicate with another device or party in the subscription service (e.g., OTT content subscription).

The network architecture 100 may include base stations 110 that can be associated with mobile network operator (MNO) 112, a set-top-box (STB) 120, a modem 130, a television 140, a user equipment (UE) 150, an Internet Service Provider (ISP) 160, a customer service representative (CSR) station 170, and a core network 180 including an OTT content server 182. STB 120 may further include a broadband access module 121, a cellular access module 122, processor(s) 123, a memory 124, a diagnostic app 125, measured signals 126, acquired telemetry data 127, a threshold module 128 including a first threshold 128-1 and a second threshold 128-2, and an in-depth diagnostic report 129. UE 150 may further include a broadband access module 151, cellular access module 152, processor(s) 153, a memory 154, a diagnostic app 155, measured signals 156, acquired telemetry data 157, a threshold module 158 including a first threshold 158-1 and a second threshold 158-2, and an in-depth diagnostic report 159. The STB 120 is in communication with the OTT content server 182 through a radio interface 115 or through an ISP interface 165 such as fiber optic, cable, and the like. UE 150 may similarly communicate with the OTT content server 182 through the radio interface 115 or through a direct wireless link 162 (e.g., Wi-Fi signal) that connects the UE 150 to the STB 120. The radio interface 115 and the ISP interface 165 are example channel connections and additional alternate channels or interfaces (not shown) may be implemented to connect the viewer's device (i.e., STB 120, UE 150) to the OTT content server 182. In various embodiments, the television 140 (through the STB 120) and the UE 150 may leverage their multi-channel connections (ISP and cellular network connections) to the OTT content server 182 for performing cross-party diagnostic testing. The STB 120 or the UE 150, for example, may leverage their respective ability to measure signals via their broadband access module 121/151 and to acquire the telemetry data via their cellular access module 122/152. In this example, the diagnostic app 125/155 may compare the measured signals 126/156 and the acquired telemetry data 127/157 with a first set of threshold values (first threshold 128-1/158-1) and a second set of threshold values (second threshold 128-2/158-2), respectively, to determine the possible root cause of the interruption. The possible root cause may include the OTT content server 182, the ISP interface 165, the STB 120, or the television 140. The diagnostic app 125/155 may then perform in-depth diagnostic testing on the suspected root cause of the interruption, and generate the in-depth diagnostic report 129/156 for the viewer 190, CSR station 170, and/or other parties to the subscription service. In this regard, the viewer 190 may obtain background on the possible root cause of the interruption, and the viewer 190 can avoid unnecessary escalation of the interruption to other parties especially the CSR station 170 in particular where even a technically savvy viewer 190 may get frustrated by verbal instructions that may be provided by a sales representative from the CSR station 170. As described herein, the measured signals 126/156 (in the ISP interface) and the acquired telemetry data 127/157 (in the radio interface) may include the downloading and uploading data rates, the bandwidth allocated for different services, traffic pattern, transmission delay, jitters, packet loss rate, availability, and other data measurements that can be used as references by the diagnostic app 125/155 for the cross-party diagnostic testing. Further, the OTT content server 182 and the MNO 112 may be operated by a single entity so that a dedicated channel such as a dedicated radio channel, Cat-M, or NB-IoT channel (not shown) can be allocated for the acquiring of the telemetry data 127/157, which is used by the diagnostic app 125/155 as a reference for the cross-party diagnostic testing.

UE 150 may include a smartphone, a tablet computer, an embedded computer system, or any other device that is capable of using the wireless communication services that are provided by the wireless carrier network. The UE 150 may receive the broadband signals (e.g., OTT content) in the ISP interface 165 via the direct wireless link 162. Alternatively, the UE 150 may receive the OTT content via the radio interface 115. The diagnostic app 155 of the UE 150 may be triggered by a scheduled diagnostic testing, viewer's request, a signal request from the STB 120 such as when the measured signals 126 are lesser than the first threshold 128-1, or when the UE 150 detects the measured signals 156 that are below the first threshold 158-1. For example, and when the diagnostic app 155 of the UE 150 is triggered by a viewer's request, the UE 150 may acquire the measured signals 156 via the direct wireless link 162, and compare the measured signals 156 with the first threshold 158-1. In another example, and when the diagnostic app 155 of the UE 150 is triggered by the signal request from the STB 120, the UE 150 may request the STB 120 to send the measured signals 126, and the UE 150 then compare the received measured signals 126 with the first threshold 158-1. In these examples, the triggered diagnostic app 155 may then compare the acquired telemetry data 157 with the second threshold 158-2 to determine the possible root cause of the interruption.

The core network 180 may include components that support 2G and 3G voice traffic, as well as 3G, 4G, and 5G data traffic. For example, 3G data traffic between the UE 150 and the Internet (not shown) may be routed through a gateway of a 3G Packet Switch (PS) Core. On the other hand, 3G voice traffic between the viewer device and a Public Switched Telephone Network (PSTN) may be routed through a Mobile Switch (MSC) of a 3G Circuit Switch (CS) core. The core network 104 may further include components that support 4G and 5G voice and data traffic. Such components may include an Evolved Packet Core (EPC) and an IP Multimedia Subsystem (IMS) core. The IMS core may provide the UEs 150 with data access to external packet data networks, such as the networks of other wireless telecommunication providers, as well as backend servers in the core network 180 such as the OTT content server 182. However, for the purpose of illustration clarity, the PS core, PSTN, MSC, and other components are not shown in FIG. 1.

Core network 180 may provide core network services to the STB 120, UE 150, CSR station 170, and other similar devices. In various embodiments, the core network 180 may provide the OTT content from the OTT content server 182 to the STB 120/UE 150 via the radio interface 115. However, and to save bandwidth in the wireless channel (radio interface 115), the core network 180 may utilize the broadband channel (ISP 160) for the delivery of the OTT content while the radio interface 115 can be used to provide the telemetry data for the diagnostic app 125/155.

Base stations 110 in the network architecture 100 may be collectively referred to as Evolved Universal Mobile Telecommunications System (UMTS) Terrestrial Radio Access Network (E-UTRAN) that can be connected to the core network 180 through backhaul links 183 (e.g., S1 interface). Base stations 110 may perform the transfer of data including voice, video, and messaging in general. Base stations 110 may perform mobility control functions such as handover and dual connectivity, inter-cell interference coordination, connection setup and release, load balancing, distribution for non-access stratum (NAS) messages to UEs, NAS node selection, paging, positioning, delivery of warning messages, and detecting of current locations of the UEs 150. Further, base stations 110 may communicate directly or indirectly with each other over a backhaul link 184 (e.g., X2 interface). The backhaul link 184 may be wired or wireless. In various embodiments, the base station 110 facilitates the acquiring of the telemetry data 127/157 in the radio interface 115.

MNO 112 may include a provider of wireless communications services to an end-user including radio spectrum allocation, wireless network infrastructure, and the like. MNO 112 may own/control access to the radio spectrum license, and control elements of the wireless network infrastructure that provides the wireless communications services to viewers (e.g., viewer 190). Given a situation where the OTT content is delivered to the STB 120 or UE 150 through the radio interface 115, the MNO 112 may provide a dedicated channel such as the Cat-M or NB-IoT channel (not shown) for the acquiring of the telemetry data over the same radio interface 115. The dedicated channel may utilize the spectrum channel that is licensed to the MNO 112.

Radio interface 115 may include an example channel or medium that facilitates cellular network communications between the base station 110 and the STB 120, UE 150, CSR station 170, and other cellular network devices. Radio interface 115 may use one or more licensed bands of the associated MNO 112. For example, the base station 110 is associated with the MNO 112 that owns a radio spectrum license including 28 GHz/39 GHz high band, 2.5 GHz/3.5 GHz mid-band, or 600 MHz/700 MHz low band. In this example, the base station 110 may use the different licensed bands in the radio interface 115 during uplink (UL) and/or downlink (DL) transmissions between the base station 110 and the STB 120, UE 150, and other cellular devices. In example embodiments, the radio interface 115 includes a dedicated licensed band for purposes of performing the diagnostic testing as described herein including the acquiring of the telemetry data. In this embodiment, the dedicated licensed band may include the Cat-M, NB-IoT or other alternate channel that is separate and independent from the channel to be used for the delivery of the OTT content to the STB 120 and/or UE 150. For example, the Cat-M, NB-IoT and/or the other alternate channel is used to directly interact with the viewer 190. In this example, the NB-IoT and/or the alternate channel may use a smaller bandwidth or utilize a different channel configuration as compared to the channel configuration for the delivery of the OTT content. The Cat-M channel may also be used when the direct interaction with the viewer 190 requires a higher bandwidth (e.g., 1 MHz) than the bandwidth that is supported by the NB-IoT (about 200 KHz).

STB 120 may include hardware, software, or a combination of hardware and software that is used to receive the OTT content from the OTT content server 182. The STB 120 may include circuit components that transform the received signal from the modem 130 to a form that can be displayed in the television 140 or other display devices. The STB 120 may enable viewers to access multiple TV delivery methods including cable and satellite. In various embodiments, the STB 120 may be configured to perform cross-party diagnostics testing on account of a scheduled diagnostic test, a viewer's request, or upon detection of the deviation in the measured signals 126 in the ISP interface 165. The STB 120 may use its communication interfaces, processor 123, and the diagnostic app 125 to perform the cross-party diagnostic testing in determining the root cause of the media content interruption. The root cause may include the OTT content server 182 that can generate an error/malfunction during creation, storage, and/or transfer of the media content, the modem 130 that can supply signal errors due to improper demodulation, the STB 120 itself due to hardware malfunction, or the connected television 140 due to wrong configuration, etc.

Measured signals 126/156 may include sampled electrical signals in the channel (e.g., ISP interface 165, radio interface 115) that are used to receive the OTT content. The sampled electrical signals may include frequencies that are used to deliver the OTT content, the bandwidth of the channel, data throughput in the channel, RSSI level of the received OTT content, and other electrical signals that are associated with the delivery of the OTT content to the device (STB 120/UE 150). In an embodiment, the diagnostic app 125/155 is triggered when the measured signals 126/156 are lower than the first threshold 128-1/158-1, which includes the minimum values of the sampled electrical signals that are necessary or desirable for the effective delivery of the OTT to the device. For example, the OTT content may include a high definition media content that utilizes a minimum of 10 MHz data throughput for effective delivery to the device. In this example, the first threshold 128-1/158-1 may include a minimum threshold value of 10 MHz data throughput. The measured signals 126/156 that are lower than the first threshold 128-1/158-1 may generate the detected signal deviations that can cause the interruption in the receiving of the OTT content. In this embodiment, the acquired telemetry data 127/157 may be used by the diagnostic app 125/155 as a reference for determining whether the root cause of the detected signal deviation is the OTT content server 182, the ISP interface 165, modem 130, STB 120 itself, or the television 140.

Telemetry data 127/157 may include sampled electrical signals in the channel (e.g., ISP interface 165, radio interface 115) where the sampled electrical signals are used for the cross-party diagnostic testing as described herein. The sampled electrical signals may include data metrics such as continuity of signals in the interfaces that connect the STB 120/UE 150 to the OTT content server 182, RSSI level of the signals in the interfaces that connect the STB 120/UE 150 to the OTT content server 182, data throughput during uplink and downlink transmissions, and the like. In various embodiments, the telemetry data 127/157 is compared to the second threshold 128-2/158-2 that includes the minimum values of the data metrics that are necessary or desirable for the effective delivery of the OTT content in the same channel or different channel. For example, the telemetry data 127/157 may be acquired through the use of the cellular access module 122/152 while the measured signals 126/156 are measured by the broadband access module 121/151, or vice-versa. In another example, the telemetry data 127/157 may be acquired via a VPN channel (not shown) in the same ISP interface 165 that is used by the broadband access module 121/151 to receive the OTT content. In another example still, the telemetry data 127/157 may be acquired via a Cat-M channel or NB-IoT channel (not shown) in the same radio interface 115 that is used by the cellular access module 122/152 to receive the OTT content, and so forth.

In-depth diagnostic report 129 may include information about the in-depth diagnostic testing that is performed on the possible component that can be the root cause of the deviation. The performed in-depth diagnostic testing on the component may include, but is not limited to, identifying manufacture name, model name, current version and software revisions made, performed test measurements such as data throughput rate, performed repairs, and the like. In various embodiments, the in-depth diagnostic report 129 may include a recommendation such as instructions for the viewer on how to resolve the interruption without escalating the detected deviation to all parties in the subscription.

ISP 160 may include an example access point that provides a connection to the Internet. ISP 160 may also provide software packages such as browsers, e-mail accounts, and a personal website or home page. The ISP 160 may utilize wired interfaces such as fiber-optics, copper wire, and other forms to provide Internet access to the viewers. The ISP 160 may also use wireless signals in delivering the OTT content to the STB 120. The modem 130 may link the ISP 160 to the STB 120. Particularly, the modem 130 may include hardware, software, or a combination thereof, that converts the ISP signals into a format suitable for transmission or for consumption by the STB 120. In some examples, the ISP 160 may also include a dedicated channel for purposes of performing the diagnostic testing as described herein including the acquiring of the telemetry data. In this case, the dedicated channel may include a virtual private network (VPN) channel or other alternate channel that is separate and independent from the channel to be used for the delivery of the OTT content to the STB 120 and/or UE 150. For example, the VPN and/or the other alternate channel is used to directly interact with the viewer 190. In this example, the VPN and/or the alternate channel may use a smaller bandwidth or utilize a different channel configuration as compared to the configuration of the channel that is used for the delivery of the OTT content.

OTT content server 182 may include general-purpose computers or other electronic devices that are capable of receiving input, processing the input, and generating output data. In an implementation, the OTT content server 182 may include software or a combination of hardware and software that provides audio, video, and other media content over the Internet such as through the ISP 160. The ISP 160 may be aware of the contents of the Internet Protocol (IP) packets that are received by the STB 120 but are not responsible for, nor able to control, the viewing abilities, copyrights, and/or other redistribution of the content.

Example Operation Scenarios

The STB 120 and the UE 150 may include multi-channel connections to the OTT content server 182 in order to receive the OTT content and/or to perform the cross-party diagnostic testing. For example, the STB 120 is connected to the OTT content server 182 via a first channel such as the ISP interface 165 and via a second channel such as the radio interface 115. Similarly, the UE 150 is connected to the OTT content server 182 via the ISP interface 165 (through the direct wireless link 162) and via the second channel such as the radio interface 115.

In example embodiments, the STB 120 receives the media content (OTT content) through the ISP 160 ($1^{st}$ channel) and displays the media content in the television 140. However, the viewer 190 may encounter problems such as the inability of the STB 120 to receive and/or display the media content properly or the inability of the modem 130 to receive IP signals from the core network 180, and so forth. The problem can be manifested by a loss of video and/or audio signals, loss of electronic programming guide, and other types of media content interruption. In this case, the diagnostic app 125 in the STB 120 may compare the measured signals 126 with the first threshold 128-1 to detect the signal deviation. Given a situation where the measured signals 126 are less than the first threshold 128-1, then the diagnostic app 125 may compare the telemetry data 127 with the second threshold 128-2 to detect the possible root cause of the problem. If the acquired telemetry data 127 is above the second threshold 128-2, then the cross-party diagnostic testing may indicate the television 140, ISP 160, or another component other than the OTT content server 182 as the possible root cause of the problem. However, and if the acquired telemetry data 127 is below the second threshold 128-2, then the cross-party diagnostic testing may indicate the OTT content server 182 as the possible root cause of the problem. Further, if the measured signals 126 and the acquired telemetry data 127 are above the first threshold 128-1 and second threshold 128-2, respectively, during the scheduled diagnostic test, then the cross-party diagnostic testing may indicate the television 140 as the possible root cause of the problem. In these examples, the STB 120 leverages its ability to connect with the OTT content server 182 via the radio interface 115 and the ISP interface 165.

In example embodiments, diagnostic app 125 in the STB 120 may trigger the diagnostic app 155 in the UE 150 when the measured signals 126 are below the first threshold 128-1. In this case, the use of the telemetry data 127 may not be reliable to use as a reference for the cross-party diagnostic testing since the STB 120 itself may be broken. As such, the STB 120 may use the detected deviation as a reference for triggering the diagnostic app 155 in the UE 150. With the received triggering signal from the STB 120, the UE 150 may assume the measured signals 126 to be below the first threshold 128-1 and use the comparison between the telemetry data 157 and the second threshold 158-2 to perform the cross-party diagnostic testing. For example, if the acquired telemetry data 157 is above the second threshold 158-2, then the cross-party diagnostic testing may indicate the television 140, ISP 160, or another component other than the OTT content server 182, as the possible root cause of the problem. However, and if the acquired telemetry data 157 is below the second threshold 158-2, then the cross-party diagnostic testing may indicate the OTT content server 182 as the possible root cause of the problem, and so on.

The measured signals 126/156 and the telemetry data 127/157 may include the same measurement units as that of the first threshold and the second threshold, respectively. For example, when the measured signals 126/156 include data throughput (e.g., Mbps), then the first threshold 128-1/158-1 may include measurement units of Mbps as well. In another example, when the acquired data metrics include RSSI levels (e.g., dBm), then the second threshold 128-2/158-2 may include measurement units of dBm as well, and so on. In example embodiments, the first threshold 128-1/158-1 and the second threshold 128-2/158-2 include preconfigured values or calculated values. The preconfigured values of the first threshold 128-1/158-1 and the second threshold 128-2/158-2 may include the preset minimum values that are necessary and desirable for the effective delivery of the OTT content. For example, a preconfigured value of 4 Mbps may be used as the minimum value of the data throughput to display a good video quality in the television 140. In this example, the 4 Mbps may be used as the first threshold 128-1/158-1 and the second threshold 128-2/158-2 for the cross-party diagnostic testing. On the other hand, the calculated values may include the average values of the measured signals 126/156 or the average values of the telemetry data 127/157 over a particular time period. For example, the data throughput in the ISP interface 165 for the delivery of the OTT content has been running at 4 Mbps since initialization. In this example, the average value of 4 Mbps may be used as the first threshold 128-1/158-1 and the second threshold 128-2/158-2 for the cross-party diagnostic testing.

In various embodiments, the first threshold 128-1/158-1 and the second threshold 128-2/158-2 may include the same preconfigured values or different preconfigured values depending upon the parameter that is used in the cross-party diagnostic testing. When the diagnostic app 125/155 utilizes the data throughput rates for the first threshold and the second threshold, then the diagnostic app 125/155 may use the same or equal minimum values of data throughput rates in the first threshold and the second threshold unless the corresponding channels that are used to measure signals and to acquire data metrics are configured to have different channel bandwidths. However, and when the diagnostic app 125/155 utilizes the latency for the first threshold and the second threshold, then the diagnostic app 125/155 may use different minimum values of latency in the first threshold and the second threshold due to additional end-to-end service delay in the delivery of the media content through the wireless channel (e.g., via base station 110). For example, the additional delay (e.g., 10 ms) may be used to compensate for the different characteristics of the radio interface 115 over the ISP interface 165.

With the obtained comparison results, the diagnostic app 125/155 may perform the in-depth diagnostic testing of the OTT content server 182, ISP 160, STB itself, or the television 140. For example, the in-depth diagnostic testing of the STB 120 may include checking of input and output impedances, verifying of connection links, checking of STB configuration, and the like. In another example, the in-depth diagnostic testing of the television 140 may include checking of configuration, capability for displaying the media content, hardware status, and the like. After the in-depth diagnostic testing for the OTT content server 182, ISP interface 165, modem 130, STB 120, or television 140, the diagnostic app 125/155 may then generate the in-depth diagnostic report 129/159 for the viewer 190. In various embodiments, the in-depth diagnostic report 129/159 may be forwarded to other parties such as the ISP 160 operator, OTT content server, and/or the CSR station 170.

In other embodiments, and given a situation where the STB 120 or UE 150 cannot acquire the telemetry data 127/157 in the wireless radio interface 115, the STB 120/UE 150 may utilize a VPN (not shown) to gather the telemetry data 127/157 from the OTT content server 182. The VPN may include a dedicated channel bandwidth in the ISP interface 165 that may be utilized to acquire the telemetry data 127/157. In some examples, the Cat-M, NB-IoT or other alternate cellular network channel in the radio interface 115 may also be used to gather the telemetry data 127/157 and/or to directly interact with the viewer 190. In this case, the STB 120 or UE 150 may leverage their multi-connections to improve the viewer experience as described herein.

Example Cross-Party Diagnostic Testing

Figure 2:
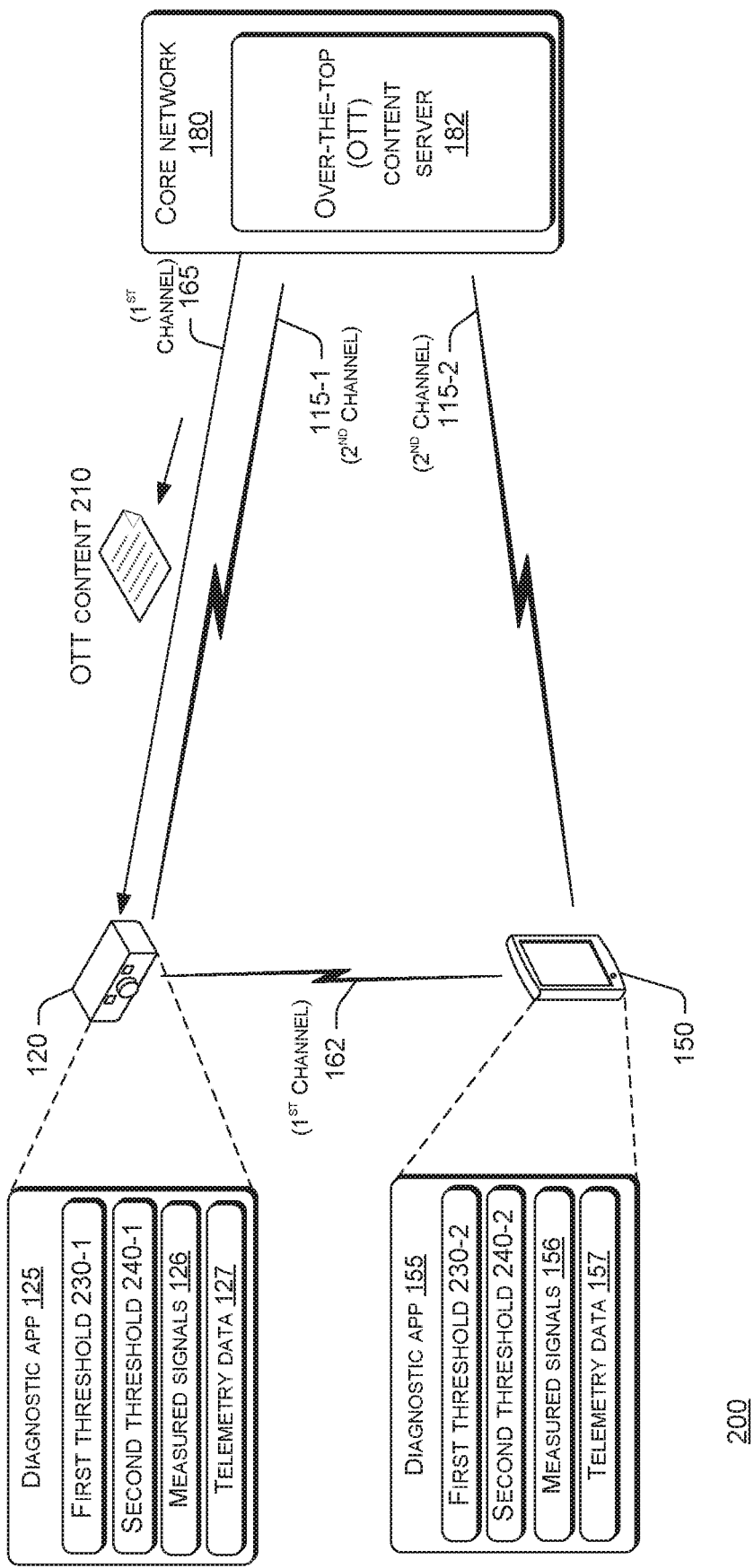
FIG. 2 is a diagnostic testing diagram that shows the measuring of signals and acquiring of telemetry data that are used as references for the cross-party diagnostic testing.

FIG. 2 shows a diagnostic testing diagram 200 for determining the component or interface that may be the possible root cause of the interruption as described herein. Diagnostic testing diagram 200 shows the viewer's device (STB 120, UE 150) that is connected to the OTT content server 182 via different connecting channels. For example, the STB 120 is connected to the OTT content server 182 via ISP interface 165 (as the first channel) and radio interface 115-1 (as the second channel). Similarly, the UE 150 is connected to the OTT content server 182 via the direct wireless signal 159— ISP interface 165 link (as the first channel) and radio interface 115-2 (as the second channel). Diagnostic testing diagram 200 further shows an OTT content 210 that is received by the STB 120 through the ISP interface 165, the measured signals 126/156, and the telemetry data 127/157. The diagnostic app 125 of the STB 120 may be configured to utilize a first threshold 230-1 and a second threshold 240-1 while the diagnostic app 155 of the UE 150 can be configured to use a first threshold 230-2 and a second threshold 240-2. The diagnostic testing diagram 200 illustrates the leveraging of the multi-channel connections between the STB 120/UE 150 and the OTT content server 182 for performing cross-party diagnostic testing as described herein.

In example embodiments, the STB 120 is receiving the OTT content 210 via the first channel such as the ISP interface 165. In this embodiment, the STB 120 utilizes the first threshold 230-1 to detect the signal deviation in the ISP interface 165. The first threshold 230-1, for example, may include the preconfigured minimum values of the data throughput, transmission delay, jitter, RSSI level, or other measurement signals in the ISP interface 165 that are associated with the delivery of the OTT content 210 from the OTT content server 182. In this example, the STB 120 compares the measured signals 126 in the ISP interface 165 with the first threshold 230-1. The measured signals 126 may include actual sampled electrical signals such as the data throughput, transmission delay, jitter, RSSI level, or other measurement signals in the ISP interface 165. When the measured signals 126 are less than the first threshold 230-1, then the processor 123 may send a signal that triggers the diagnostic app 125 in the STB 120 or the diagnostic app 155 in the UE 150. The diagnostic app 125/155 may then use the second threshold 240-1/240-2 as a reference for the cross-party diagnostic testing that is performed by the STB 120/UE 150. The second threshold 240 may include the preconfigured minimum value of the data throughput, transmission delay, jitter, power loss, or other measurement signals that are taken in a remote point or in a different channel such as the wireless radio interface 115 in the given example. In other cases, the second threshold 240 may include the average of the acquired telemetry data over a time period. For example, the STB 120 measures an average data throughput of 10 Mbps in the wireless radio interface 115 over a time period for the delivery of the OTT content 210. In this example, the STB 120 may utilize the baseline 10 Mbps as the second threshold 240-2 to be used in the cross-party diagnostic testing.

Given a situation where the UE 150 is receiving the OTT content 210 via the direct wireless signal 159 (first channel), the UE 150 may utilize the radio interface 115-2 (second channel) in acquiring the telemetry data 157. In example embodiments, and when the diagnostic app 155 is triggered by the scheduled diagnostic testing or viewer request, the UE 150 compares the measured signals 156 with the first threshold 230-2. The UE 150 may further compare the telemetry data 157 with the second threshold 240-2. Based upon comparison results, the UE 150 may determine the possible root cause of the interruption.

The use of different interfaces (i.e., radio interface 115 and the ISP interface 165) is for illustration purposes, and each one of the radio interface 115 and the ISP interface 165 may further utilize their own alternate channels to gather telemetry data. For example, a VPN channel of the ISP interface 165 may be used to gather the telemetry data while the Cat-M or NB-IoT of the radio interface 115 can be used to send notifications to the viewer. In this example, another alternate channel in the radio interface 115 or ISP interface 165 may be used to directly interact with the viewer.

Example Cross-Party Diagnostic Testing

Figure 3:
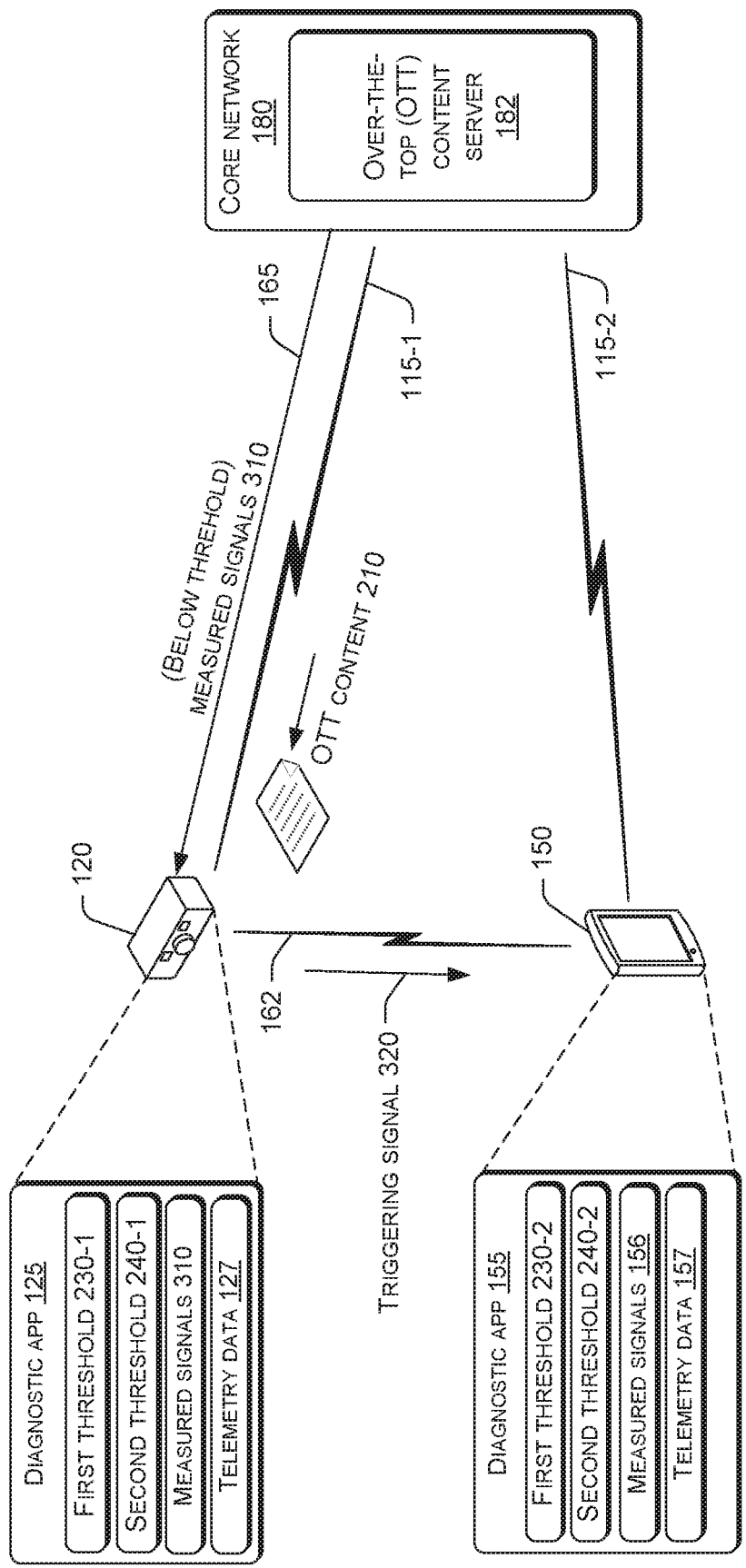
FIG. 3 is a diagnostic testing diagram that shows devices leveraging their multi-channel connections to an OTT content server.

FIG. 3 shows a diagnostic testing diagram 300 for determining the component that may be the possible root cause of the interruption as described herein. Diagnostic testing diagram 300 shows the viewer's device (STB 120, UE 150) that is connected to the OTT content server 182 via different connecting channels. For example, the STB 120 is connected to the OTT content server 182 via ISP interface 165 (as the first channel) and radio interface 115-1 (as the second channel). Similarly, the UE 150 is connected to the OTT content server 182 via the direct wireless signal 159—ISP interface 165 link (as the first channel) and radio interface 115-2 (as the second channel). Diagnostic testing diagram 300 further shows the OTT content 210 that is received by the STB 120 through the wireless radio interface 115-1, a below threshold measured signals 310, a triggering signal 320, and the telemetry data 127/157. The diagnostic app 125 of the STB 120 may be configured to utilize a first threshold 230-1 and a second threshold 240-1 while the diagnostic app 155 of the UE 150 can be configured to use a first threshold 230-2 and a second threshold 240-2. The diagnostic testing diagram 300 illustrates the leveraging of the multiple connections between the STB 120/UE 150 and the OTT content server 182.

In example embodiments, the diagnostic app 125 of the STB 120 utilizes the first threshold 230-1 to detect the deviation in the ISP interface 165 (first channel). For example, the STB 120 compares the below threshold measured signals 310 with the first threshold 230-1 to detect the signal deviation. Given a situation where the signal deviation is detected in the first channel, then the STB 120 may utilize its wireless radio interface 115-1 (second channel) connection to the OTT content server 182 to receive the OTT content 210. This provides seamless delivery of the OTT content 210 even though the detected signal deviation may produce interruption in the delivery of the OTT content 210 via the first channel. Further, the STB 120 is configured to send the triggering signal 320 to the UE 150 in order to activate the diagnostic app 155 of the UE 150. In various embodiments, the UE 150 performs the cross-party diagnostic testing by comparing the acquired telemetry data 157 in the wireless radio interface 115-2 with the second threshold 240-2. Based on the comparison results, the diagnostic app 155 may perform in-depth diagnostics as described herein. Afterward, the diagnostic app 155 may send the in-depth diagnostic report 159 to the viewer, STB 120, CSR station 170, ISP, or to the OTT content server. The in-depth diagnostic report 159 may include the detection of the deviation in the ISP interface 165, the information with regard to the use of the wireless radio interface 115-1 for the receiving of the OTT content 210, the possible root cause of the deviation, and the like.

Example Cross-Party Diagnostic Testing Results

Figure 4:
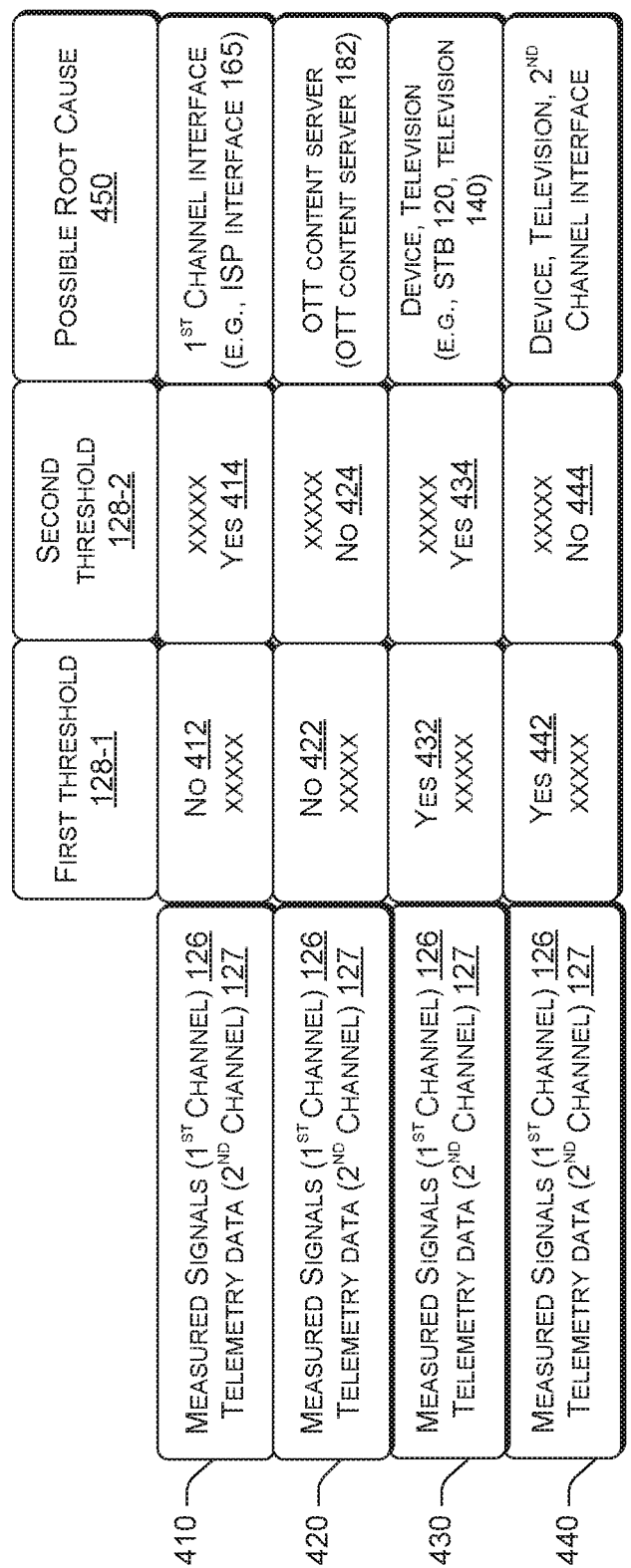
FIG. 4 is an example table of diagnostic testing results that may be generated by a diagnostic app in a set-top-box (STB).

FIG. 4 is a table 400 showing an example of diagnostic testing results that may be generated, for example, by the diagnostic app 125 of the STB 120. Row sections of the table 400 show scenarios 410, 420, 430, and 440 including the measured signals 126 and the acquired telemetry data 127 for each one of the scenarios 410-440. Column sections of table 400 show the first threshold 128-1, second threshold 128-2, and possible root cause 450. In various embodiments, the diagnostic app 125 of the STB 120 utilizes the first comparison results between the measured signals 126 and the first threshold 128-1, and the second comparison results between the telemetry data 127 and the second threshold 128-2 to generate the possible root cause 430.

For example, and for the first scenario 410, the measured signals 126 are below the first threshold 128-1 as shown by "No 412" while the acquired telemetry data 127 are above the second threshold 128-2 as shown by "Yes 414." In this example, the possible root cause 450 may include the first channel interface (e.g., ISP interface 165) that is used to deliver the OTT content 210 to the STB 120. The first channel interface may be the possible root cause of the interruption because of the signal deviations in the measured signals 126 when they are below the first threshold 128-1. For the telemetry data 127 in the second channel, the above threshold value may indicate the second channel to be working properly. In other embodiments such as in a speed test, the telemetry data 127 may be used to determine the presence of signal deviations in the first channel even without the comparison results between the measured signals 126 and the first threshold 128-1. In this embodiment, the diagnostic app 125 sends a test signal in the first and second channels and then determines the signal deviations in the first channel based on the latency of the returned signal.

For the second scenario 420, the measured signals 126 are below the first threshold 128-1 as shown by "No 422" and the acquired telemetry data 127 is also below the second threshold 128-2 as shown by "No 424." In this case, the possible root cause 450 may include the OTT content server 182. The OTT content server 182 may be the possible root cause of the interruption because of the below-threshold values of the measured signals 126 and the telemetry data 127 in the first channel and second channel, respectively.

For the third scenario 430, the measured signals 126 are above the first threshold 128-1 as shown by "Yes 432" and the acquired telemetry data 127 is also above the second threshold 128-2 as shown by "Yes 434." In this case, the possible root cause 450 of the interruption in the consumption of the OTT content may include the STB-connected television or the STB itself. The above threshold values in the first and second channels may indicate that the OTT content server 182 and the first/second channels are working properly. For the fourth scenario, and following the steps as described above, the possible root cause 450 may include the second channel interface, the STB-connected television, or the STB 120 itself. In various embodiments, the diagnostic app 125 may further perform additional diagnostic testing on the possible root cause 450 as described.

Example Device Components

Figure 5:
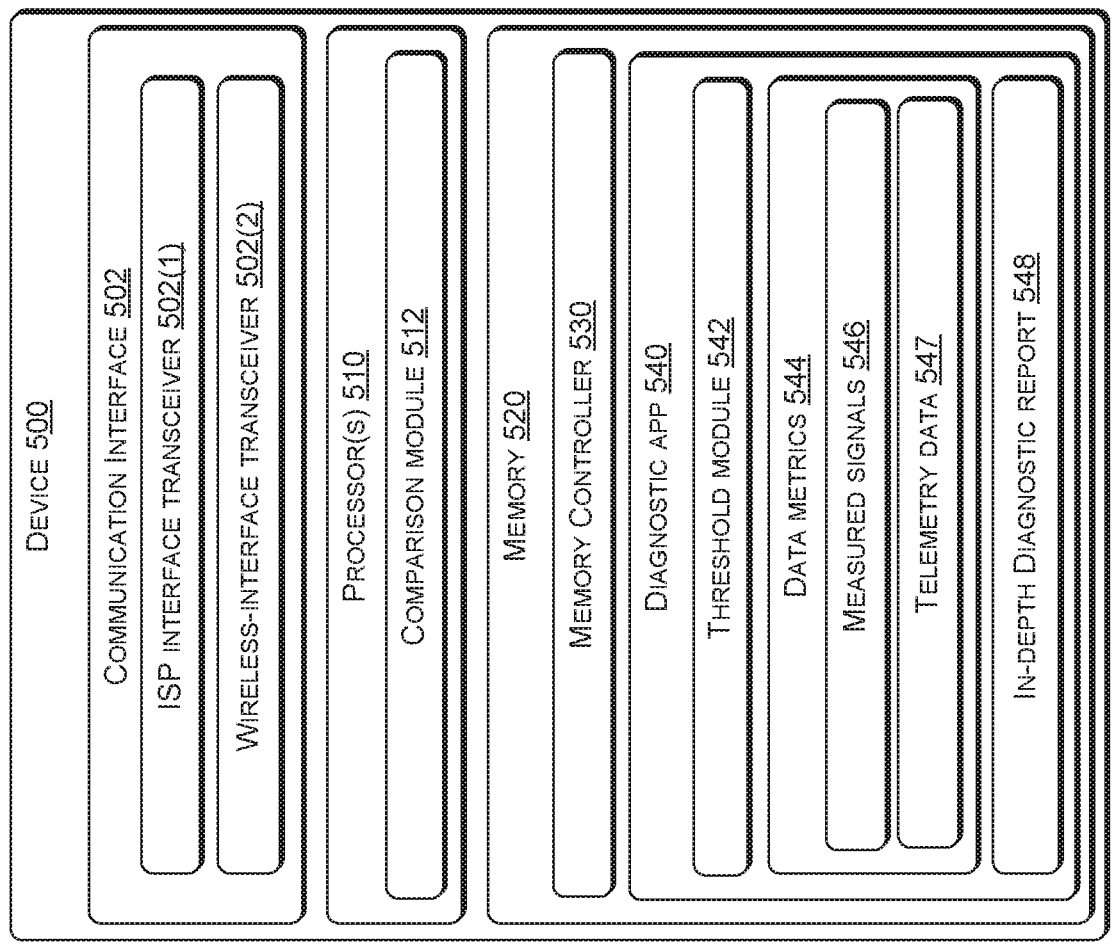
FIG. 5 is a block diagram showing various components of the device that accesses the OTT content server via multi-channel connections.

FIG. 5 is a block diagram showing various components of an illustrative device 500 that performs the cross-party diagnostic testing on the delivery of the OTT content by the OTT content server. The device 500 can be the STB 120, UE 150, a smart TV, and the like. It is noted that the device 500 as described herein can operate with more or fewer of the components shown herein. Additionally, the device 500 shown herein, or portions thereof can serve as a representation of one or more of the servers of the present system.

Device 500 may include a communication interface 502, one or more processors 510, and a memory 520. Processors 510 may further include a comparison module 512. Memory 520 further includes a memory controller 530, and a diagnostic app 540 including a threshold module 542, data metrics 544, measured signals 546, telemetry data 547, and in-depth diagnostic report 548.

Communication interface 502 may include hardware, software, or a combination of hardware and software that transmits and/or receives data from the OTT content server 182 via the different channels such as the ISP interface 165 and the radio interface 115. Communication interface 502 may include a first channel transceiver 502(1) and a second channel transceiver 502(2) that facilitate communications, for example, through the ISP interface 165 and the radio interface 115, respectively. The first channel transceiver 502(1) and the second channel transceiver 502(2) may include corresponding hardware circuit components such as amplifiers, filters, equalizers, etc. that can be used to process data and/or transmit/receive data. For example, the first channel transceiver 502(1) includes hardware circuit components that facilitate broadband network communications between the device 500 and the OTT content server 182. The second channel transceiver 502(2) may also include separate hardware circuit components that facilitate, for example, cellular network communication between the device 500 and the OTT content server 182, or any other UE/device through the radio interface 115. In this embodiment, the first channel transceiver 502(1) operates independently of the second channel transceiver 502(2).

The communication interface 502 may establish connections via one or more networks, such as, but not limited to, one or more of WiMax, a Local Area Network (LAN), Wireless Local Area Network (WLAN), a Personal area network (PAN), a Campus area network (CAN), a Metropolitan area network (MAN), a wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 5G (new radio), 3G (e. g., WCDMA/UMTS based 3G networks), 4G, IMT-Advanced, pre-4G, LTE Advanced, mobile WiMax, WiMax 2, WirelessMAN-Advanced networks, General packet radio service (GPRS), enhanced GPRS, iBurst, UMTS, HSPDA, HSUPA, HSPA, HSPA+, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Processor(s) 510 may be a central processing unit(s) (CPU), graphics processing unit(s) (GPU), both a CPU and GPU, or any other sort of processing unit(s). The one or more processor(s) 510 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 510 may also be responsible for executing all computer applications stored in the memory, which can be associated with common types of volatile (RAM) and/or non-volatile (ROM) memory. For example, the processor 510 may utilize the comparison module 512 to compare the measured signals 546 and the acquired telemetry data 547 with the first threshold 230 and the second threshold 240, respectively. The values of the first threshold 230 and the second threshold 240 may be preconfigured or calculated and are stored in the threshold module 542.

The memory 520 may be implemented using computer-readable media, such as computer-readable storage media. Computer-readable media includes, at least, two types of computer-readable media, namely computer-readable storage media and communications media. Computer-readable storage media includes, but is not limited to, Random Access Memory (RAM), Dynamic Random Access Memory (DRAM), Read-Only Memory (ROM), Electrically Erasable Programmable Read-Only Memory (EEPROM), flash memory or other memory technology, Compact Disc-Read-Only Memory (CD-ROM), digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. As defined herein, computer-readable storage media do not consist of and are not formed exclusively by, modulated data signals, such as a carrier wave. In contrast, communication media may embody computer-readable instructions, data structures, program modules, or other data in a modulated data signal, such as a carrier wave, or other transmission mechanisms. The memory 520 may also include a firewall. In some embodiment, the firewall may be implemented as a hardware in the device 500.

Memory controller 530 may include hardware, software, or a combination thereof, that enables the memory 520 to interact with the communication interface 502, processor(s) 510, and other components of the device 500. For example, the memory controller 530 retrieves the values of the first threshold 230 and the second threshold 240 from the threshold module 542. In another example, the memory controller 530 retrieves the values of the signal measurements (measured signals 546) and the acquired telemetry data 547 that may be stored in the data metrics 544. In these examples, the retrieval of the measured signals 546 and the acquired telemetry data 547 may be performed upon the triggering of the diagnostic app 540.

Diagnostic app 540 may include hardware, software, or a combination thereof, that performs cross-party diagnostic testing and in-depth diagnostic testing of the component that is suspected as the possible root cause of the interruption. In example embodiments, the diagnostic app 540 is triggered by a viewer's request, a scheduled diagnostic testing, or when the processor 510 detects the signal deviation in the measured signals 546. If the diagnostic app 540 is triggered by the viewer's request or the scheduled diagnostic test, the processor 510 may use the first channel transceiver 502(1) to obtain the values of the measured signals 546 and then compare the measured signals 546 with the first threshold 230. This comparison facilitates the detection of the signal deviation in the measured signals 546. In a situation where the signal deviation is detected in the measured signals 546, the diagnostic app 540 may use the second channel transceiver 502(2) to acquire the telemetry data 547 and then compare the acquired telemetry data with the second threshold 240. The diagnostic app 540 may then use the comparison results for the cross-party diagnostic testing as described herein.

In various embodiments, the diagnostic app 540 of the device 500 is triggered by the detection of the signal deviation from another device. For example, device 500 includes the UE 150 that receives the triggering signal 320 from another device such as the STB 120. In this example, the device 500 performs the cross-party diagnostic testing by acquiring the telemetry data 547 via the second channel transceiver 502(2), and then comparing the acquired telemetry data 547 with the second threshold. In response to the acquired telemetry data 547 that is less than the second threshold 240, then the cross-party diagnostic testing may indicate the OTT content server 182 as the possible root cause of the interruption.

In various embodiments, the processor 510 may further compare a different type of telemetry data 547 with a corresponding second threshold 240 to confirm the first comparison between the acquired telemetry data 547 and the second threshold 240. For example, the processor 510 may compare the acquired data throughput and the acquired latency (i.e., data metrics) with the preconfigured second threshold values for the data throughput and latency, respectively. In this example, the diagnostic app 540 may use the comparison results as a reference for performing the in-depth diagnostic on the OTT content server 182. In case of different comparison results such as when the data throughput-data metric comparison is above the second threshold while the latency-data metric comparison is below the second threshold, then the in-depth diagnostic may be performed on the OTT content server 182 rather than eliminating it from the possible root causes of the interruption.

Example Process

Figure 6:
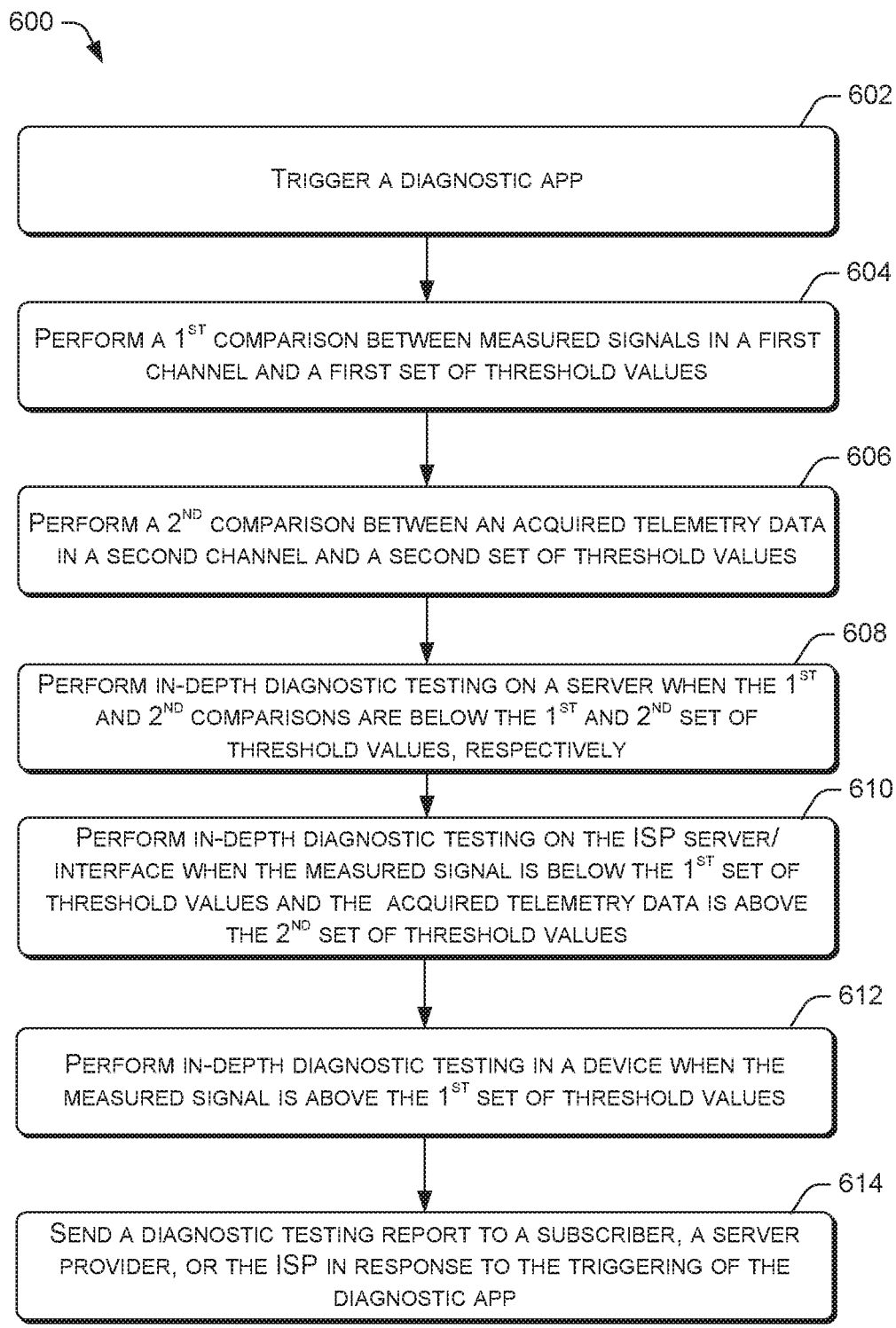
FIG. 6 is a flow diagram of an example process for performing cross-party diagnostic testing to improve the viewer experience.

FIG. 6 presents illustrative process 600 for improving subscriber experience using the cross-party diagnostic testing. The process 600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 600 is described with reference to FIGS. 1-5.

FIG. 6 is a flow diagram of an example process 600 for performing cross-party diagnostic testing to improve subscriber experience in accessing the OTT content from the OTT content server. At block 602, triggering a diagnostic app is performed. For example, the diagnostic app 125/155 is triggered by a viewer's request, periodical diagnostic testing such as every 48 hours, or upon the detection of the signal deviation in the signal measurements such as in the first channel (e.g., ISP interface 165). At block 604, performing a first comparison between a measured signal in a first channel and a first set of threshold values is performed. In various embodiments, the first set of threshold values (e.g., first threshold 230) may be utilized as a reference for detecting the signal deviation that can trigger the diagnostic app 125/155. For example, when the data throughput in the ISP interface 165 is below the data throughput threshold, then the diagnostic app 125/155 is triggered. In other cases where the diagnostic app 125/155 is triggered by the viewer's request or due to scheduled diagnostic tests, then the first threshold is not utilized as the baseline for the triggering of the diagnostic app 125/155. In this case, the cross-party diagnostic testing is initiated even though the signal measurements in the ISP interface 165 is greater than the first threshold 230. At block 606, performing a second comparison between an acquired telemetry data in a second channel and a second threshold is performed. For example, the processor 123/153 performs a measurement of the telemetry data 220 in the second channel (e.g., radio interface 115). With the acquired telemetry data 220, the processor 123 may then compare the measured telemetry data 220 with the second threshold 240.

At block 608, performing in-depth diagnostic testing on the OTT content server when the measured signals and the acquired telemetry data are below the first threshold and the second threshold, respectively, is performed. In example embodiments, the STB 120 or UE 150 measures the telemetry data 220 when requested by the viewer, due to scheduled diagnostic test, or upon triggering of the diagnostic app 125/155. Given a situation where there is an interruption in the displaying of the OTT content 210 and the measured telemetry data 220 is below the second threshold 240, the STB 120 or UE 150 may perform in-depth diagnostic testing on the OTT content server 182. In this situation, the STB 120 or UE 150 leverages its ability to access the same OTT content 210 via multi-channel connections. In example embodiments, the in-depth diagnostic testing on the OTT content server 182 may include checking of subscription status, change in protocol, or adjustment in the configuration that is not compatible with the configuration of the STB 120/UE 150's subscription.

At block 610, performing in-depth diagnostic testing on the ISP server and interface when the measured signal is below the first threshold and the acquired telemetry data is above the second threshold is performed. For example, the STB 120/UE 150 may perform in-depth diagnostic testing on the ISP interface 165 that is connected to the modem 130. The in-depth diagnostic on the modem 130 may include signing-in on the modem's firmware to adjust the modem settings, checking for software updates, checking for a restart schedule, verifying maintenance setting, and the like. The in-depth diagnostic testing on the ISP 160 server may include checking connection status of the ISP 160 server to the STB 120 via the ISP interface 165, verifying the configuration, firewall, or security software of the ISP 160 server to correspond with the configuration of the STB 120, and the like. The in-depth diagnostic testing on the ISP interface 165 may include checking the protocol that is used for the delivery of the OTT content 210 through the ISP interface 165, checking for a broken or damaged link in the ISP interface 165, and the like.

At block 612, performing in-depth diagnostic testing on a device when the measured signal is above the first threshold is performed. For example, in-depth diagnostic testing on the device such as the STB 120 may include checking adjustment of channels, checking "Settings" tab such as transmission setting, software updates, and other configuration settings. At block 614, sending an in-depth diagnostic testing report to a subscriber, a server provider, or ISP is performed. For example, the in-depth diagnostic testing report may include the in-depth diagnostics that were performed on the OTT content server 182, ISP server/interface, and the STB 120. The in-depth diagnostic testing report may be further served to the CSR station 170, the ISP server operator, and the MNO.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more computer-readable storage media storing computer-executable instructions that upon execution cause one or more processors to perform acts comprising:
   receiving, by a device, an over-the-top (OTT) content via an Internet Service Provider (ISP) interface;
   measuring signals in the ISP interface and comparing measured signals with a first set of threshold values;
   acquiring telemetry data in a cellular network interface and comparing acquired telemetry data with a second set of threshold values;
   performing an in-depth diagnostic testing in the ISP interface when the measured signals are below the first set of threshold values and the acquired telemetry data is above the second set of threshold values;
   performing an in-depth diagnostic testing on an OTT content server when the measured signals and the acquired telemetry data are below the first set of threshold values and the second set of threshold values, respectively;

performing an in-depth diagnostic testing on the device when the measured signals are above the first set of threshold values; and sending an in-depth diagnostic report to a viewer.

2. The one or more computer-readable storage media of claim 1 further comprising: triggering a diagnostic application (app) in the device when the measured signals are less than the first set of threshold values.

3. The one or more computer-readable storage media of claim 1, wherein the device includes a set-top-box (STB).

4. The one or more computer-readable storage media of claim 3, wherein the OTT content is delivered to the STB by the OTT content server via the ISP interface and the cellular network interface.

5. The one or more computer-readable storage media of claim 3, wherein the STB triggers a diagnostic app in another device when the measured signals are less than the first set of threshold values.

6. The one or more computer-readable storage media of claim 1, wherein the measured signals include a data throughput and a latency.

7. The one or more computer-readable storage media of claim 6, wherein the first set of threshold values and the second set of threshold values include the same preconfigured values when the data throughput is utilized for cross-party diagnostic testing.

8. The one or more computer-readable storage media of claim 6, wherein the first set of threshold values and the second set of threshold values include different preconfigured values when the latency is utilized for cross-party diagnostic testing.

9. The one or more computer-readable storage media of claim 1, wherein the second set of threshold values includes an average value of the telemetry data in the cellular network interface over a time period.

10. A device, comprising:
a broadband access module configured to receive an over-the-top (OTT) content via an Internet Service Provider (ISP) interface;
a cellular access module configured to acquire telemetry data in a cellular network interface;
a processor configured to compare measured signals in the ISP interface with a first set of threshold values and to compare acquired telemetry data with a second set of threshold values;
a diagnostic application (app) that is in communication with the processor, the diagnostic app is configured to perform:
an in-depth diagnostic testing in the ISP interface when the measured signals are below the first set of threshold values and the acquired telemetry data is above the second set of threshold values;
an in-depth diagnostic testing on an OTT content server when the measured signals and the acquired telemetry data are below the first set of threshold values and the second set of threshold values, respectively; and an in-depth diagnostic testing on the device when the measured signals are above the first set of threshold values; and wherein the diagnostic app sends an in-depth diagnostic report to a viewer.

11. The device of claim 10, wherein the diagnostic app is triggered when the measured signals are less than the first set of threshold values.

12. The device of claim 10, wherein the diagnostic app is configured in a set-top-box (STB).

13. The device of claim 12, wherein the OTT content is delivered to the STB by the OTT content server via the ISP interface and the cellular network interface.

14. The device of claim 12, wherein the STB triggers another diagnostic app in another device when the measured signals are less than the first set of threshold values.

15. The device of claim 10, wherein the measured signals include a data throughput and a latency.

16. The device of claim 15, wherein the first set of threshold values and the second set of threshold values include the same preconfigured values when the data throughput is utilized for cross-party diagnostic testing.

17. The device of claim 15, wherein the first set of threshold values and the second set of threshold values include different preconfigured values when the latency is utilized for cross-party diagnostic testing.

18. A computer-implemented method, comprising:
receiving, by a device, an over-the-top (OTT) content via an Internet Service Provider (ISP) interface;
measuring signals in the ISP interface and comparing measured signals with a first set of threshold values;
triggering a diagnostic application (app) in the device when the measured signals are less than the first set of threshold values, wherein the diagnostic app further performs:
acquiring telemetry data in a cellular network interface and comparing the acquired telemetry data with a second set of threshold values;
performing an in-depth diagnostic testing in the ISP interface when the measured signals are below the first set of threshold values and the acquired telemetry data is above the second set of threshold values;
performing an in-depth diagnostic testing on an OTT content server when the measured signals and the acquired telemetry data are below the first set of threshold values and the second set of threshold values, respectively; and
sending an in-depth diagnostic report to a viewer.

19. The computer-implemented method of claim 18, wherein the diagnostic app is triggered by a viewer's request.

20. The computer-implemented method of claim 19, wherein the diagnostic app performs an in-depth diagnostic testing on the device when the measured signals and the acquired telemetry data are above the first set of threshold values and the second set of threshold values, respectively.

* * * * *